May 7, 1957  C. A. CHAYNE  2,791,263
SEAT ADJUSTER

Filed March 13, 1952  6 Sheets-Sheet 1

Inventor
Charles A. Chayne
By Willits, Helwig & Baillio
Attorneys

May 7, 1957  C. A. CHAYNE  2,791,263
SEAT ADJUSTER

Filed March 13, 1952  6 Sheets-Sheet 2

Inventor
Charles A. Chayne
By Willis, Helmig & Baillio
Attorneys

United States Patent Office 2,791,263
Patented May 7, 1957

2,791,263
SEAT ADJUSTER

Charles A. Chayne, Bloomfield Township, Mich., assignor to General Motors Corporation, a corporation of Delaware Application March 13, 1952, Serial No. 276,358

12 Claims. (Cl. 155—14)

The present invention relates to adjustable seats for use in automotive vehicles, airplanes, and the like, and, more particularly, to mechanisms for adjusting such seats.

It is highly desirable in automotive vehicles, airplanes and the like to adjust the driver's or pilot's seat to best suit the requirements of the various occupants thereof. It is also apparent that in order for such seats to be practical, the adjusting mechanism must be conveniently located and be of such a nature that the proper adjustments may be effected expeditiously and with a minimum of physical effort. The mechanisms employed heretofore for adjusting vehicle seats have been either cumbersome in construction or were disposed in unhandy locations, thereby requiring considerable time and effort in order to make the desired adjustments.

One object of the present invention is to provide an adjustable mechanism for seats whereby the proper adjustments of the latter may be readily effected with a minimum of physical effort.

Another object is to provide a seat which may be adjusted to a large number of positions both fore and aft and also vertically.

A further object is to provide power means for adjusting a seat both fore and aft and also vertically.

A still further object is to provide an adjustable seat which is made of two separate elements, a lower frame or carriage, and an upper or seat frame, the carriage being movable only in a fore and aft direction relative to the automobile's floor and the upper frame being movably mounted on the carriage so that its motion relative to said carriage is in only a vertical direction.

A still further object is to provide power means for adjusting a seat both horizontally as well as vertically and push button means for controlling said means.

A still further object is to provide an adjustable seat which is simple in construction, economical to manufacture and efficient and durable in operation.

These and other objects and advantages will become more apparent as the description of the invention progresses.

Of the drawings:

Fig. 6 is a diagrammatic view of the control mechanism for the seat adjusting fluid motors.

Referring to the drawings in more detail, the numeral 1 designates one of a pair of spaced front seats of a motor vehicle which comprises a cushioned seat portion 2 and a cushioned back rest 4, both being supported on a framework 6. Framework 6 is of tubular construction and consists of a substantially U-shaped back structure 8 and a rectangular bottom or base structure 10 with transverse rungs 12 for reinforcement. The framework 6 is pivotally mounted on the forward edge of an open substantially rectangular carriage or supporting member 14 by any suitable means such as a pair of spaced hinges 16. A carriage 14 may be fabricated from any suitable material such as spaced front and rear transversely extending angle members 18 and 20 and spaced longitudinally extending side angle members 22 and 24. The ends of side members 22 and 24 may be secured to members 18 and 20 by welding or by any other suitable means.

Figure 2:
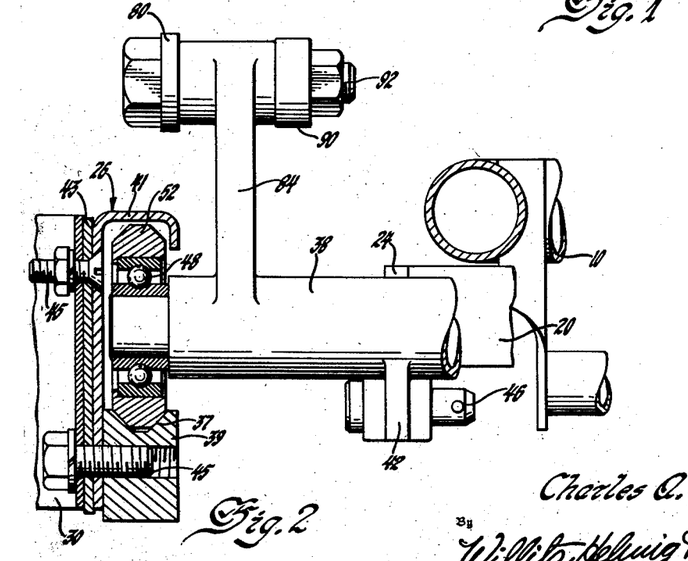
Fig. 2 is an enlarged fragmentary view of a portion of the seat adjusting mechanism taken substantially along plane 2—2 of Fig. 1.
Figure 3:
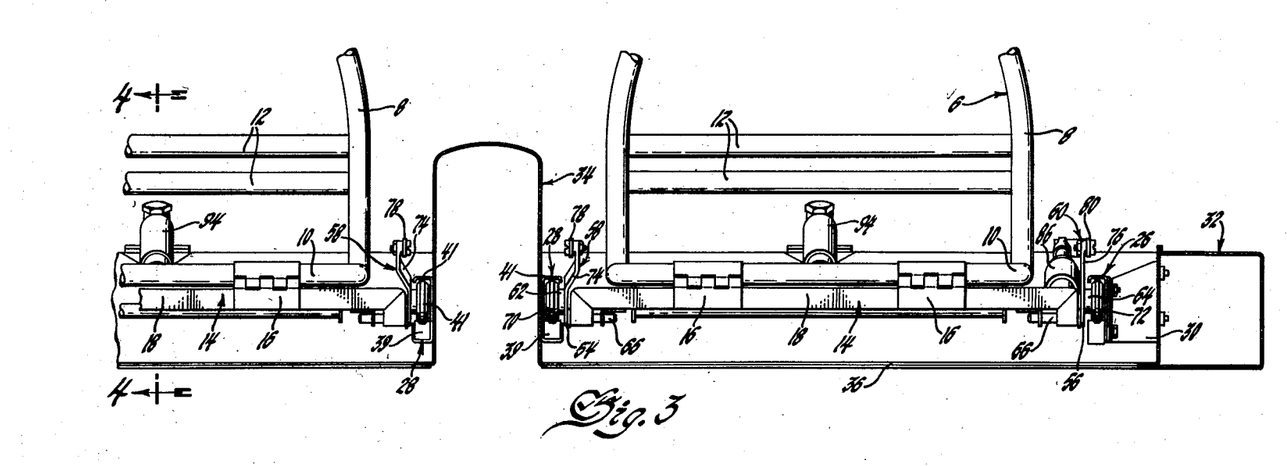
Fig. 3 is a front elevational view of the framework of the front seat structure taken substantially along line 3—3 of Fig. 1.
Figure 4:
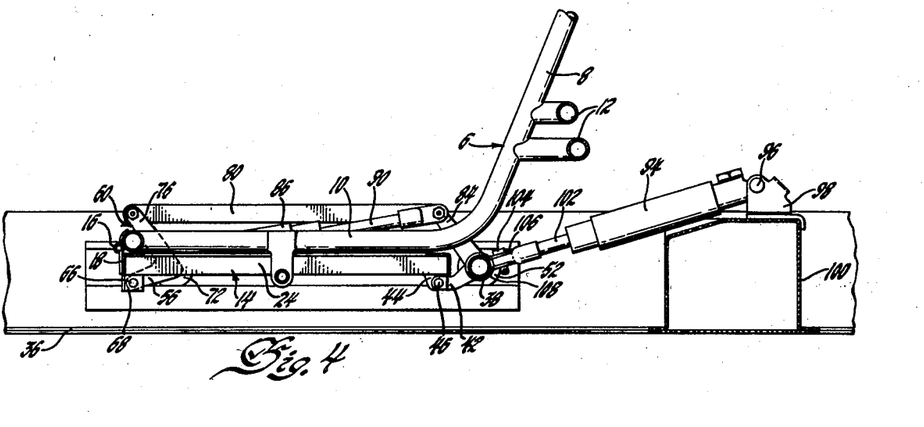
Fig. 4 is a sectional elevational view of the supporting structure taken substantially along plane 4—4 of Fig. 3.

Carriage 14 is movable fore and aft along a pair of widely spaced guide tracks 26 and 28, as will appear fully later herein. Track 26 is secured to a pair of brackets 30 projecting inwardly from a side frame member 32. Track 28 is secured in any suitable manner to an intermediate longitudinally extending frame member 34 which is disposed between front seats 1 and forms a tunnel for the driving shaft of the vehicle. This permits tracks 26 and 28 to be supported by frames 32 and 34 a short distance above the floor 36 of the vehicle. As shown more particularly in Fig. 2, track 26 is of substantially C-shaped construction to prevent the rollers 52 and 72 from becoming derailed. The rollers 52 and 72 operate in a V-shaped groove 37 running longitudinally along the upper surface of track member 39. An inverted L-shaped member 41 (Fig. 2) which is secured to the outer side of the track member 39 overlies the tops of rollers 52 and 72, thus retaining the latter in groove 37. One or more shims 43 may be provided between members 41 and the bracket 30 to align the tracks 26 and 28 for the rollers to properly operate therein. The track 26 is effectively secured to brackets 30 by bolts 45. Track 28 also comprises a longitudinally extending track member 39 having a substantially V-shaped groove at the top thereof for receiving the corresponding shaped rollers 50 and 70. Track member 39 is mounted in an inverted L-shaped supporting member 41 which in turn may be screwed to intermediate frame member 34.

The rear transverse member 20 of carriage 14 is spaced forwardly of a transverse axle member 38 and has a pair of widely spaced arms 40 and 42 extending forwardly thereof. The outer ends of arms 40 and 42 are bifurcated to receive apertured depending ears 44 provided on carriage member 14. Pins 46 extending through aligned apertures in arms 40 and 42 and ears 44 pivotally couple the rearwardly disposed end of carriage 14 on arms 40 and 42. Journaled on ball bearings 48 provided at the outer reduced ends of axle 38 are a pair of rollers 50 and 52 which are supported on and are adapted to roll along tracks 26 and 28. The front member 18 of carriage 14 is supported by the forwardly extending arms 54 and 56 of a pair of widely spaced bellcrank levers 58 and 60, respectively, pivotally supported on stub axles 62 and 64. Arms 54 and 56 are disposed in substantially parallel relation with arms 40 and 42 and the forward apertured ends thereof are pivotally attached as by pins 66 to the apertured ears 68 depending on front members 18 of carriage 14. Rollers 70 and 72 are also journaled on ball or other bearings provided at the outer ends of axle members 62 and 64, respectively. Rollers 70 and 72 also are supported on the roll along tracks 26 and 28. The upwardly extending arms 74 and 76 of bellcrank levers 58 and 60 are connected by links 78 and 80, respectively, to similarly extending arms 82 and 84 integral with or otherwise secured to axle 38. The arms 54, 56, 40 and 42 which are connected to carriage 14 and the arms 74, 76, 82 and 84 which are connected together by links 78 and 80 form parallelograms and accordingly any rocking movement of axle 38 will cause all portions of carriage 14 and the seat portion 2 supported thereon to move vertically to the same extent. However, it may be desirable to have the seat 1 tilted in a fore and aft direction as it moves vertically. This may be accomplished by any suitable means such as making the arms 54 and 56 of the front bellcranks of a different length than arms 40 and 42 of the rear bellcranks such that one end of the seat will rise or fall faster than the other end.

Figure 1:
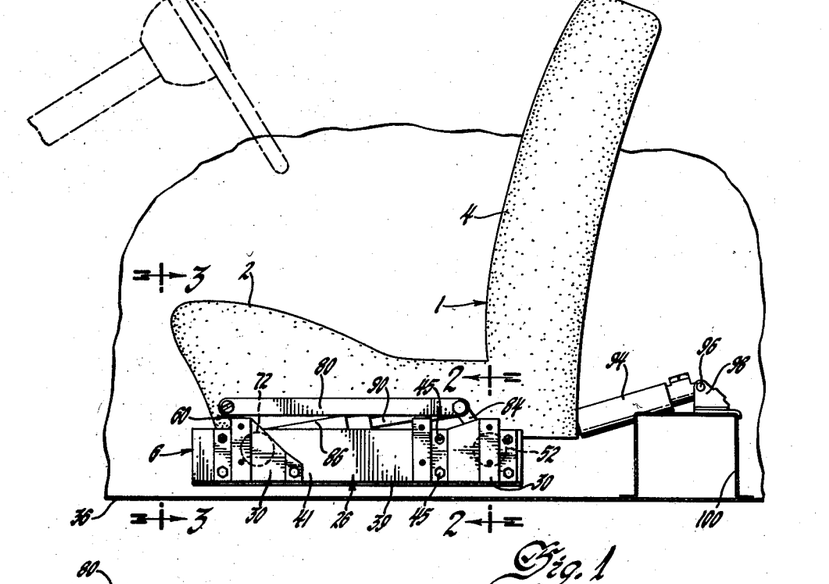
Fig. 1 is a side elevational view, partly in section, of a seat showing the adjusting mechanism associated therewith.
Figure 5:
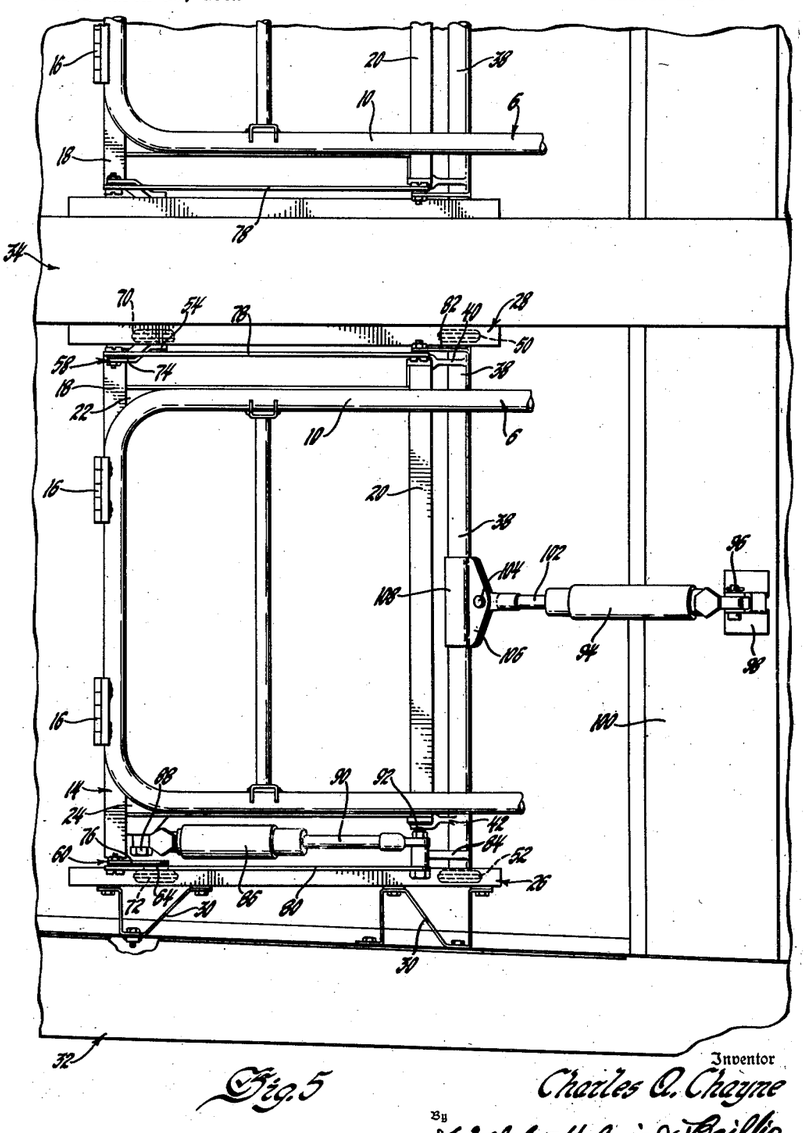
Fig. 5 is a plan view of the structure illustrated in Fig. 4.

Axle 38 is rocked to effect vertical adjustment of seat 1 by a single acting fluid motor 86. As shown more particularly in Fig. 5, the forward end of motor 86 is pivotally supported on a bolt 88 secured to the front end of member 24. The outer apertured end of the piston rod 90 of motor 86 receives and is pivotally supported on a pin 92 which is in turn pivotally connected to arms 84 and link 80. It therefore is apparent that to adjust the seat 1 downwardly the controls are so adjusted as to cause the piston of motor 86 to move to the left (Fig. 1) by the weight of seat 1 and conversely to adjust the said seat upwardly, the said controls are so adjusted as to cause the piston to move to the right by fluid pressure.

The fluid system for controlling the operation of motor 86 is of the closed type and consequently, the piston thereof, as well as seat 1, will remain in adjusted position by the hydraulic lock created when the control valve is closed. Any suitable hydraulic control mechanism may be employed, as for example that shown diagrammatically in Fig. 6 which will be described more fully hereinafter. The control valve may be operated manually or by solenoid or other electrical means if it is so desired and for convenience may be mounted on the top of frame 32 or 34 or the instrument panel if so desired.

The seat 1 may be adjusted fore and aft of the vehicle by a second fluid motor 94. Motor 94 is pivotally supported at the rearward end thereof by a pin 96 mounted in a bracket 98 secured in any suitable manner to the top of a transverse vehicle frame member 100. The forward end of the piston rod 102 of motor 94 is pivotally attached by means of a pin 104 to the rearwardly bifurcated extension 106 of a sleeve 108 loosely mounted on axle 38 intermediate the ends of the latter. Fluid motor 94 is of the double-acting type and is connected to a control system similar to that associated with fluid motor 86. The central valve or push button electrical control for the control valve may be mounted at any convenient location, preferably adjacent the controls for the motor 86. It therefore is apparent that to adjust the seat in a forward direction, the control valve is so adjusted as to cause the piston of motor 94 to move to the left (Fig. 5), and to adjust the said seat in a rearward direction, the said valve is so adjusted as to cause the piston to move to the right. The seat will remain in any adjusted position by the hydraulic lock created in the system when the control valve is closed.

Referring to Fig. 6 which shows more or less diagrammatically the fluid motors 86 and 94 and controls therefore, the numeral 110 designates any suitable source of fluid supply which may be disposed in any convenient location. A pump 112 driven by a motor 114 is connected at the inlet side thereof by a pipe 116 to supply tank 110. The discharge side of pump 112 is connected by a pipe 118 to the inlet port 120 of a valve 122. Inlet port 120 is disposed between the valve heads 124 and 126 of the sliding control valve 122 which are interconnected by a rod 128. Valve heads 124 and 126 normally close ports 130 and 132, respectively. The ports 130 and 132 are connected to the opposite ends of the cylinder forming motor 94 by pipes 134 and 136. The ends of rod 128 extend outwardly from valve heads 124 and 126 and constitute the cores of solenoids 138 and 140, respectively. A pair of centering coil springs 142 and 144 extend between the outer ends of valve heads 124 and 126 and the end walls of casing 146. The opposite ends of valve chamber 148 are exhausted by return pipe 150 which communicates with the supply tank 110.

Pipes 118 and 150 are connected, respectively, to the ports 152 and 154 of the control valve 155 for controlling the operation of single acting fluid motor 86 by pipes 156 and 158. Ports 152 and 154 are normally closed by a pair of spaced valve heads 160 and 162 connected by a rod 164. A third port 166 is connected to the lower end of the cylinder forming motor 86 by a pipe 168. The outer ends of rod 164 extend through valve heads 160 and 162 and form the cores of solenoids 170 and 172. A pair of centering springs 174 and 176 extend between the outer ends of valve heads 160 and 162 and the end walls of valve 155. To prevent damage from excessive pressures in the valving system, a pressure relief valve 177 is connected across pipes 118 and 150.

A pair of double plate push button switches 178 and 179 control the fore and aft adjustments of carriage 14 and consequently of seat 1. One of the upper contacts 180 of switch 178 is connected to one side of a battery 182 by a wire 184, the other side of said battery being connected to ground by a wire 186. The other upper contact 180 of switch 178 is connected to one end of the coil of solenoid 138 by a wire 188, the other end of said coil being connected to ground by a wire 190. One of the lower contacts 192 of switch 178 is connected to wire 184 while the other lower contact 192 is connected by a wire 194 to one side of electric motor 114, the other side of the latter being connected to ground by a wire 198.

One of the upper contacts 200 of switch 179 is connected to wire 184 while the other upper contact 200 is connected to one end of the coils of solenoid 140 by a wire 204, the other end of the coil of said solenoid being connected to ground by a wire 206. One of the lower contacts 208 of switch 179 is connected to wire 184 while the other lower contact 208 is connected to wire 194.

A pair of push button switches 210 and 212 are provided to control the vertical adjustments of seat 1, the former being of the double plate type while the latter is of single plate construction. One of the upper contacts 214 of switch 210 is connected to wire 184. The other upper contact 214 is connected by a wire 216 to one end of the solenoid 170, the other end of the coil of the latter being connected to ground by a wire 218. One of the lower contacts 220 of switch 210 is connected to wire 184, while the other lower contact 220 is connected to wire 184. One of the contacts 224 of single plate switch 212 is connected to wire 184, while the other contact 224 is connected to one end of the coil of solenoid 172 by a wire 226, the other end of said coil being connected to ground by a wire 228.

It is apparent that to move seat 1 forwardly, push button switch 178 is closed thereby closing the circuits to motor 114 and to solenoid 138. Rod 128 is now shifted to the left causing fluid from pump 112 to enter the left hand end of motor 94 and thus move the piston 230 therein to the right to thereby move carriage 14 and consequently seat 1, forwardly. Fluid at the right hand end of motor 94 will flow to tank 110 through pipe 136, the right hand end of valve chamber 148 and pipe 150. When the seat 1 has been properly adjusted, switch 178 is released and its spring 232 opens contacts 180 and 192, thereby interrupting the circuit to motor 114 and solenoid 138. Spring 142 now moves valve heads 124 and 126 to the right causing ports 130 and 132 to close. The seat 1 is now held in adjusted position by the hydraulic lock thus created. To adjust seat 1 rearwardly switch 179 is closed, thereby again closing the circuit to motor 114 and to solenoid 140. Rod 128 is now shifted to the right causing fluid from pump 112 to enter the right hand end of motor 94. The fluid in the left hand end simultaneously flows to tank 110 through pipe 134, left hand end of valve chamber 148 and pipe 150. When the seat 1 has been properly adjusted, switch 179 is released and its spring 234 moves it to open position to interrupt the circuit to motor 114 and solenoid 140. Spring 144 then shifts valves 124 and 126 to the left to close ports 130 and 132 thus causing the seat to be held in adjusted position by a hydraulic lock. In order to adjust seat 1 upwardly switch 210 is closed, thereby closing the circuits to motor 114 and to solenoid 170. Valve heads 160 and 162 are now moved upwardly causing fluid from pump 112 to enter the lower end of the motor 86 through pipe 156, port 152, port 166 and pipe 168. The piston 236 of motor 86 now actuates frame 6 and consequently seat 1 upwards. When the seat has been sufficiently elevated, switch 210 is released causing its spring 238 to open the circuits to motor 114 and to solenoid 170. Spring 174 now moves valve heads 160 and 162 to normal position closing ports 152 and 154. Any tendency of the fluid in motor 86 to escape is prevented by valve heads 160 and 162 and accordingly the seat is retained in adjusted position by a hydraulic lock. When it is desired to lower seat 1, switch 212 is closed, thereby closing the circuit to solenoid 172. Valve heads 160 and 162 are now shifted downwardly causing valve head 162 to uncover port 154. Fluid from cylinder 86 may now flow to tank 110 through pipe 168, port 166, port 154 and pipe 158. Seat 1 will now move downwardly by its own weight. When sufficiently lowered, switch 212 is released causing its spring to move the latter to open position to thereby interrupt the circuit to solenoid 172. Spring 176 now shifts valve heads 160 and 162 upwardly causing the latter to close port 154. Valve head 160 is long enough to cover the port 152 during movement by solenoids 170 and 172.

Figure 7:
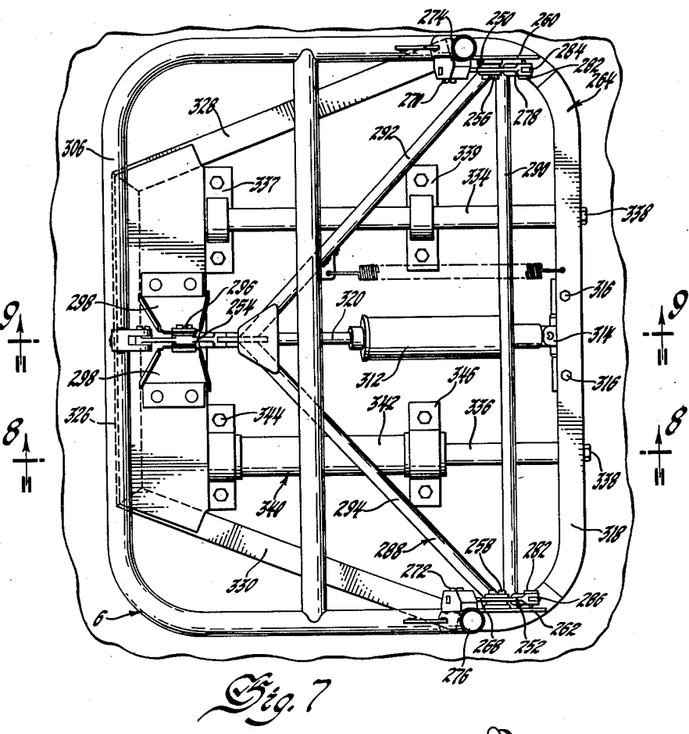
Fig. 7 is a plan view of the framework and seat adjusting mechanism of the modified construction.
Figure 8:
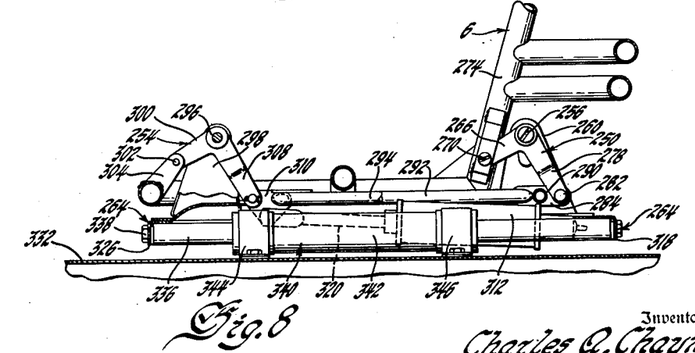
Fig. 8 is a sectional elevational view of the seat taken substantially along line 8—8 of Fig. 7 showing the seat in its lowest position of adjustment.
Figure 9:
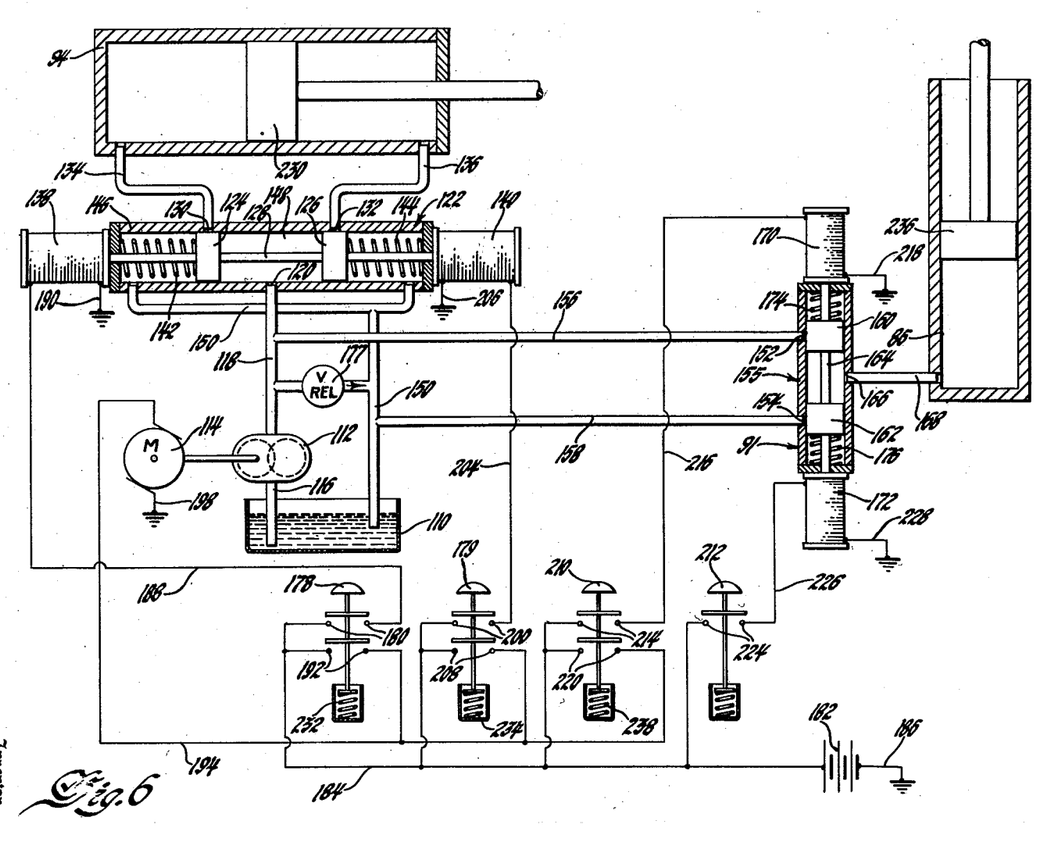
Fig. 9 is an enlarged sectional view similar to Fig. 8 but taken substantially along line 9—9 of Fig. 7 and showing the seat in its raised position.

Figs. 7, 8 and 9 show a modification of the invention. The frame 6 of the seat 1 may be of substantially the same construction as that used in the embodiment first described. The supporting structure for the frame and the mechanism for adjusting the seat, however, is of a different construction. The seat frame 6, instead of resting on the carriage proper, is supported by three bellcrank levers 250, 252 and 254. Bellcrank levers 250 and 252 are pivoted on pins 256 and 258 mounted at the upper end of brackets 260 and 262 secured to and extending upwardly from frame or carriage 264 near the rear corners thereof. The forwardly extending arms 266 and 268 of bellcrank levers 250 and 252 on pins 270 and 272 are secured to and extend inwardly from the vertical members 274, 276 of frame 6. The downwardly extending arms 278 of bellcrank levers 250 and 252 are pivotally attached by means of pins 282 to elongated plates 284 and 286 which are secured to the opposite ends of a triangular frame 288. Frame 288 comprises a transverse rear member 290 and forwardly converging side members 292 and 294 forming a triangle structure. Bellcrank lever 254 is pivotally supported on a pin 296 secured to the upper end of a bracket 298, secured to and extending upwardly from the front end of carriage 264. The forwardly extending arm 300 of bellcrank lever 254 is pivotally attached as shown at 302 to an arm 304 secured to and extending upwardly and rearwardly from the front cross member 306 of seat frame 6. The downwardly extending arm 308 of bellcrank lever 254 is pivotally attached, as shown, to the upper forward end of a substantially triangular plate 310 which is secured by any suitable manner such as welding to forward ends of the side members 292 and 294 of triangle 288. Frame 288 is moved fore and aft to rock bellcrank levers 250, 252 and 254 about their pivots to raise and lower frame 6 and consequently seat 1 by a reciprocating fluid motor 312. Motor 312 is pivotally attached, as shown, to a bracket 314 secured by bolts 316 or other suitable means to the rear cross mmeber 318 of carriage 264. The forward end of the piston rod 320 of motor 312 is pivotally attached to the lower end of triangular plate 310. Thus, when the piston of motor 312 is moved to the left (Figs. 7–8), frame 288 simultaneously rocks bellcrank levers 250, 252 and 254 in a clockwise direction thereby adjusting frame 6 and seat 1 upwardly, and conversely when the piston of motor 312 is moved to the right, frame 6 and seat 1 are adjusted downwardly.

The carriage 264 is substantially trapezoidal in construction and in addition to the rear cross member 318, comprises, a forward cross member 326 and inclined side members 328 and 330 which may be formed of angle iron or any other suitable shapes. The abutting ends of members 318, 326, 328 and 330 are secured together by welding. Carriage 264 is supported for fore and aft movement in spaced relation with the floor 332 by a pair of spaced substantially parallel rods 334 and 336. The opposite ends of rods 334 and 336 are secured by means of nuts 338 to the vertical flanges of front and rear cross members 318 and 326, respectively. Rod 334 is mounted for sliding through brackets 337 and 339 secured by any suitable means to the floor 332 of the vehicle. Rod 336 is a piston rod of a reciprocating fluid motor 340 which extends through the opposite ends of the cylinder 342. Motor 340 is secured to the vehicle floor 332 by a pair of clamp brackets 344 and 346. It therefore is seen that when the piston of motor 340 moves to the left (Fig. 7), the forward adjustment of seat 1 is effected and that when said piston moves to the right, the rearward adjustment takes place. The fluid controls for the fluid motors 312 and 340 may be the same as those for motors 86 and 94 associated with the structure shown in Figs. 1 to 5 of the drawings.

Thus, in order to raise seat 1, the operator simply adjusts a valve causing fluid to enter the right hand end (Fig. 9) of motor 312. The piston of motor 312 now rocks bellcrank levers 250, 252 and 254 in a clockwise direction through triangular frame 288. When the proper adjustment has been made, the valve is closed. The seat 1 will be held in position by the hydraulic lock created when the control valve is closed. To adjust the seat downwardly, the control valve is so adjusted as to permit fluid to drain from the motor 312. The bellcrank levers 250, 252 and 254 will now be rocked in a counterclockwise direction thereby lowering seat 1. To adjust seat 1 forwardly, another valve is actuated causing fluid to enter the right hand end (Fig. 7) of the fluid motor 340. When the proper adjustment has been effected, the control valve is closed and the seat remains in adjusted position as a result of the hydraulic lock just created. To adjust the seat rearwardly, the control valve is so actuated as to cause fluid to enter the left-hand end of motor 340. When the proper adjustment has been made, the valve is again closed and the seat remains in adjusted position.

It is therefore seen that simplified and highly useful seat adjusting mechanisms have been provided which enable proper vertical and horizontal adjustments to be made with a minimum of physical effort. The controls may be conveniently located so that the seats may be adjusted without requiring a change in position of the operator of the vehicle.

While two embodiments have been shown and described, it will be apparent to those skilled in the art that the invention may be embodied in other forms without departing from the spirit thereof. It is also apparent that, while the seat has been described for use in the vehicle, it may also be applied in aircraft or elsewhere wherein an adjustable seat is desired. It therefore is to be understood that the present embodiments are merely illustrative and in no way restrictive, and that it is intended to limit the invention only by the scope of the claims which follow.

What is claimed is:

1. In a device of the class described, the combination of a pair of spaced tracks, a plurality of horizontal axles disposed substantially perpendicularly between said tracks, roller means mounted on said axles for operation on said tracks, lever means mounted for rocking movement with said axles, a carriage pivotally supported for vertical movement on said lever means, a seat supported on said carriage, expansible means mounted on said carriage, means operatively connecting said expansible means to said lever means, a fixed support, additional motor means mounted on said fixed support, and means operatively connecting said last mentioned motor means to said carriage.

2. In an adjustable seat, the combination of fixed supporting means, a pair of spaced, substantially parallel tracks mounted on said supporting means, a plurality of horizontal axles disposed substantially perpendicularly to said tracks, wheels mounted on said axles for operation on said tracks, lever means carried by said axles, a carriage pivotally connected to said levers for vertical adjustment on said lever means, a seat supported by said carriage, fluid expansible means mounted on said carriage for rocking said lever means to vertically adjust said carriage and seat, and fluid motor means for actuating said carriage along said tracks to effect fore and aft adjustment of said carriage and seat.

3. In an adjustable seat structure, the combination of a pair of spaced, substantially parallel tracks, mounting means for supporting said tracks, a plurality of substantially horizontal axles disposed in a substantially perpendicular relation with said tracks, wheels mounted on said axles for movement along said tracks, lever means secured to said axles to rotate relative to said wheels, a linkage connecting said lever means for substantially simultaneous movement in the same direction, a carriage pivotally supported on said lever means for vertical adjustment by the latter, a seat supported on said carriage, fluid expansible means mounted on said carriage, means operatively connecting said fluid expansible means to said lever means, fluid motor means operatively connected to said mounting means, and means operatively connecting said fluid motor means to one of said axles for actuating carriage to effect fore and aft adjustment of the latter and said seat.

4. In a device of the class described, the combination of a carriage, one or more guide members secured to said carriage, supporting means for slidably supporting said guide members, motor means operatively connected to said supporting means, means operatively connecting said motor means to said carriage, a series of levers pivotally mounted on said carriage, a seat supported by said levers means connecting said levers for simultaneous movement, and expansible means mounted on said carriage for rocking said levers.

5. In an adjustable seat structure, the combination of a carriage, a plurality of elongated substantially parallel rods connected to said carriage for supporting the latter, means for slidably supporting said rods, fluid operating means for moving said carriage in a direction substantially parallel to said rods, a series of levers—pivotally mounted at spaced points on said carriage, a linkage interconnecting said levers for substantially simultaneous movement, a seat supported by said levers for vertical adjustment, and fluid expansible means for rocking said levers relative to said carriage.

6. An adjustable seat structure, comprising, in combination, a carriage, a plurality of elongated substantially parallel rods connected to said carriage for supporting the latter, means for slidably supporting said rods, fluid motor means for moving said carriage in a direction parallel to said rods to adjust said seat in a fore and aft direction, a series of levers pivotally mounted on said carriage, a linkage connecting said levers for substantially simultaneous movement, a seat pivotally connected to said levers, fluid expansible means carried with said carriage for rocking said leveres relative to said carriage to vertically adjust said seat.

7. In an adjustable seat, the combination of fixed supporting means, a pair of spaced substantially parallel tracks mounted on said supporting means, a plurality of horizontal axles disposed substantially perpendicularly to said track, wheels mounted on said axles for operation on said tracks, lever means carried by said axles, a carriage pivotally supported for vertical adjustment on said lever means, fluid expansible means mounted on said carriage for rocking said means to vertically adjust said carriage and seat, fluid motor means for actuating said carriage along said tracks to effect fore and aft adjustment of said carriage and seat, and valve means for controlling the operation of said motor and said expansible means.

8. In an adjustable seat, the combination of fixed supporting means, a pair of spaced substantially parallel tracks mounted on said supporting means, a plurality of horizontal axles disposed substantially perpendicularly to said track, wheels mounted on said axles for operation on said tracks, lever means carried by said axles, a carriage pivotally supported for vertical adjustment on said lever means, fluid expansible means mounted on said carriage for rocking said means to vertically adjust said carriage and seat, fluid motor means for actuating said carriage along said tracks to effect fore and aft adjustment of said carriage and seat, means for controlling the operation of said motor and said expansible means, said means comprising at least one valve, a solenoid for actuating said valve means, and at least one switch to operate said solenoid.

9. A seat adjuster comprising a pair of spaced substantially parallel guide members adapted to be mounted in a vehicle structure, a plurality of rotatable levers supported by said guide members for movement longitudinally thereof, means adapted to be attached to said vehicle structure and being connected to said levers for moving said levers longitudinally of said guide members independently of the angular disposition of said levers, a seat structure carried by said levers, additional means moveably supported by said guide members and being positioned to move longitudinally of said guide members with said levers, said additional means being operatively associated with said levers to cause rotation thereof independently of the longitudinal position of said levers on said guide members.

10. A seat adjuster comprising a pair of spaced substantially parallel guide members adapted to be supported in a vehicle structure, a carriage supported by said guide members for movement longitudinally thereof, a plurality of levers supported by said guide members and being pivotally attached to said carriage, said carriage and said levers being positioned for simultaneous movement longitudinally of said guide members independent of the angular disposition of said levers, a seat structure supported by said levers, motor means for movement longitudinally of said guide members with said carriage and being connected to said levers, said motor means being effective to cause said levers to rotate and change the elevation of said seat structure substantially independent of the longitudinal position of said carriage on said guide members, and second motor means adapted to be secured to said vehicle structure and being effective to move said carriage longitudinally of said guide members substantially independently of the angular disposition of said levers.

11. An adjustable seat structure comprising the combination of a pair of substantially parallel guide members, means supported by said guide members for movement therealong, a plurality of rotatably mounted levers pivotally connected to said means for movement therewith independently of their angular displacement, said levers being interconnected with each other for simultaneous rotational movement, a seat supported by said levers to be carried therewith, a motor supported by said means for longitudinal movement with said levers and being positioned for rotating said levers to effect vertical adjustment of said seat, and power means for moving said carriage in a substantially horizontal path determined by said guide members independent of the angular displacement of said levers.

12. An adjustable seat structure comprising the combination of a seat portion, means supporting said seat for substantially horizontal movement, a plurality of rotatably mounted levers carried by said means for movement therewith and being adapted for supporting said seat portion and for rotating and thus moving said seat portion in a vertical direction, said levers being interconnected with each other for substantially simultaneous rotation, motor means operatively connected to said levers and carried by said first mentioned means for horizontal movement therewith for effecting vertical movement of said seat independent of the horizontal movement thereof.

References Cited in the file of this patent

UNITED STATES PATENTS

| | | |
|---|---|---|
| 1,664,129 | Pallenberg | Mar. 27, 1928 |
| 1,957,785 | Knapp | May 8, 1934 |
| 2,111,519 | Whedon et al. | Mar 15, 1938 |
| 2,132,009 | Ball | Oct. 4, 1938 |
| 2,583,349 | Widman et al. | Jan. 22, 1952 |
| 2,596,033 | King | May 6, 1952 |
| 2,640,465 | McLeod | June 2, 1953 |
| 2,641,305 | Oishei | June 9, 1953 |
| 2,647,558 | Rappl | Aug. 4, 1953 |
| 2,687,536 | Miller | Aug. 31, 1954 |